(12) United States Patent
Hsu

(10) Patent No.: US 8,797,934 B2
(45) Date of Patent: Aug. 5, 2014

(54) METHODS AND APPARATUS FOR OPTIMIZING POWER-CONSUMPTION AND SIGNALING OVERHEAD IN MOBILE COMMUNICATION DEVICES

(75) Inventor: Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 13/443,253

(22) Filed: Apr. 10, 2012

(65) Prior Publication Data
US 2013/0267213 A1    Oct. 10, 2013

(51) Int. Cl.
*H04W 52/02*    (2009.01)
(52) U.S. Cl.
USPC ......... 370/311; 455/574; 455/550.1; 370/318
(58) Field of Classification Search
CPC ............................... H04W 52/02; H04W 76/06
USPC ........... 455/424, 516, 67.13, 252, 574, 550.1; 370/441, 347, 318, 311
See application file for complete search history.

(56) References Cited

U.S. PATENT DOCUMENTS

| | | | |
|---|---|---|---|
| 2003/0210658 A1* | 11/2003 | Hernandez et al. | ........... 370/311 |
| 2008/0253312 A1 | 10/2008 | Park | |
| 2009/0201906 A1* | 8/2009 | Fukui | ........................... 370/345 |
| 2009/0318199 A1 | 12/2009 | Barreto et al. | |
| 2011/0151944 A1 | 6/2011 | Morgan | |
| 2011/0159895 A1 | 6/2011 | Arzelier et al. | |
| 2011/0269463 A1 | 11/2011 | Wang et al. | |
| 2012/0281561 A1* | 11/2012 | Shukla et al. | ................. 370/252 |

FOREIGN PATENT DOCUMENTS

WO    WO2011025284 A2    3/2011

OTHER PUBLICATIONS

International Search Report and Written Opinion—PCT/US2013/035977—ISA/EPO—Jul. 12, 2013.
3GPP TS 25.331 V8.14.0 (Mar. 2011) 3rd Generation Partnership Project; Technical Specification Group Radio Access Network; Radio Resource Control (RRC); Protocol specification (Release 8).
GSMA, Network Efficiency Task Force Fast Dormancy Best Practices, V1.0, May 26, 2010, pp. 1-21.

* cited by examiner

*Primary Examiner* — Kiet Doan
*Assistant Examiner* — Dung Lam
(74) *Attorney, Agent, or Firm* — Stanton Braden

(57) ABSTRACT

Methods and apparatus for optimizing power consumption in a wireless device by determining optimal signal release timing are disclosed. An accumulated data volume of one or more data calls received and transmitted in a device is measured during a first time period in which the device is in a connected state. After this period, the accumulated data volume is compared to a data volume threshold. Based on this comparison, a second time period may be set to either short or long time values, where the second time period is a time of the connected state of the device. After the second time period expires, SCRI signaling is sent to release the connected state of the device. By selectively setting the timing of the connected state of a device based on accumulated data volume during a first period, the timing for signaling of release from a connected state is optimized.

24 Claims, 7 Drawing Sheets

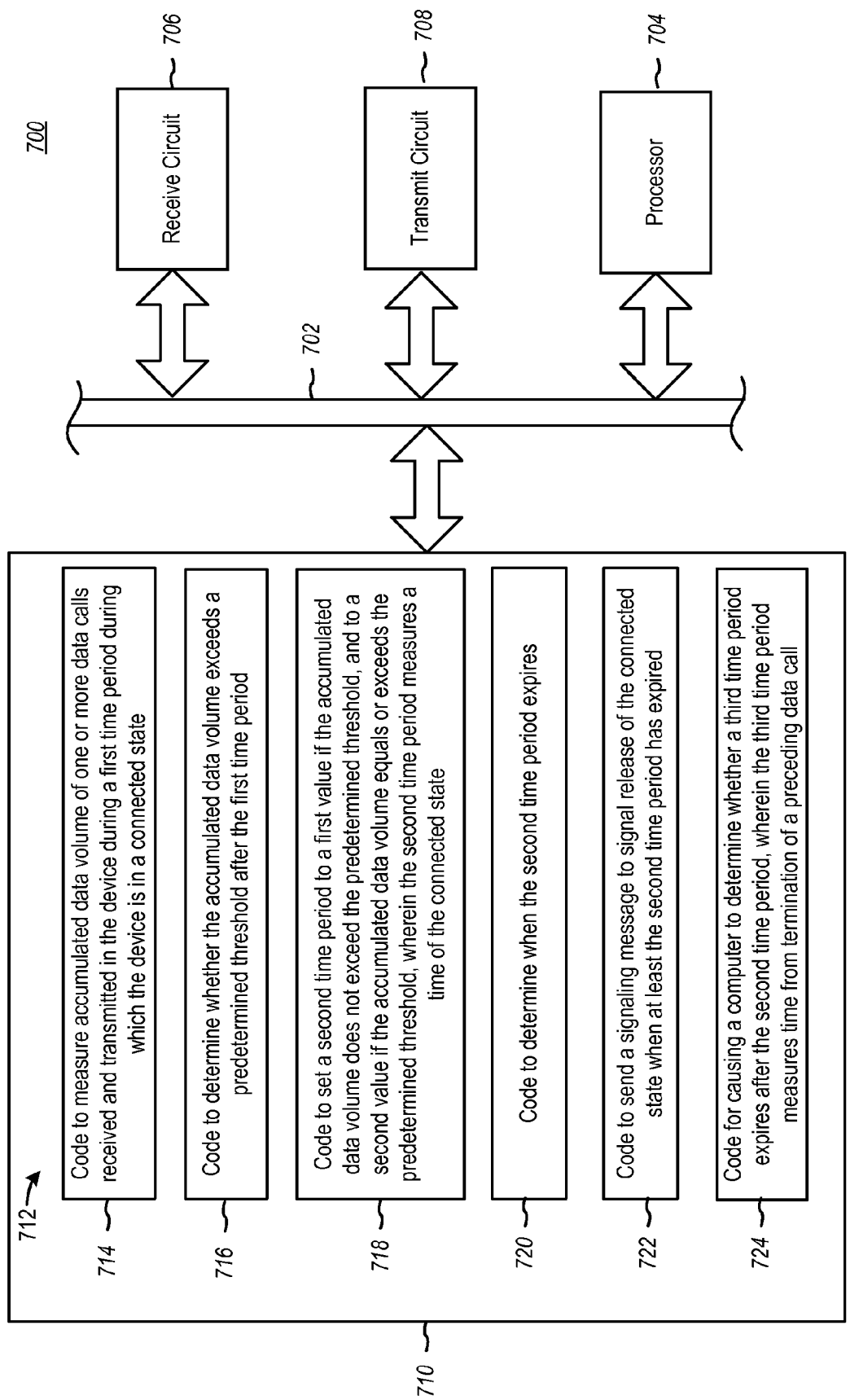

METHODS AND APPARATUS FOR OPTIMIZING POWER-CONSUMPTION AND SIGNALING OVERHEAD IN MOBILE COMMUNICATION DEVICES

BACKGROUND

1. Field

The present disclosure relates generally to methods and apparatus to optimize power consumption and signaling data overhead in mobile communication devices, and more specifically to methods and apparatus to optimize power consumption in mobile devices having high power consumption and signaling overhead due to, among other things, data applications, such as in smart phone devices, by optimizing a signal release time.

2. Background

With the advent of smartphones and data cards, wireless data applications have taken mobile connectivity and workforce mobility to greater levels. Smartphone and data cards allow users to access wireless Internet on the go with high data rate connectivity whenever and wherever desired. The resultant growth in data traffic has been exponential.

A problem that was not foreseen in the prior art with such growth is that the communication network dimension, which used to be focused on "user traffic", now has a "signaling overload" issue due to the this growth in data traffic due to the popularity of smartphone applications. This is problematic for a communication network (e.g., 3G or 4G networks utilizing 3GPP technologies such as Universal Mobile Telecommunications System (UMTS), High-Speed Packet Access (HSPA), Long Term Evolution (LTE), Evolved HSPA (HSPA+), etc.) as the signaling overhead may take up to 30-40% of cell power utilization based on known field investigations. This signaling overhead may comprise Packet switch (PS) Signaling as well as other signaling.

Power consumption of an advanced mobile device, such a smartphone, is also a critical issue affecting battery life. If a mobile device is put in an "always-on" state (i.e., connected state), this can reduce the signaling overhead and reduce the signaling latency caused by the time delay arising each time a call is setup and then released, but increases power consumption. On the other hand, if a mobile device is put into a low power consumption state (e.g. idle state), the battery life can be extended, but with increased time delay for call setup and signaling overhead. In a particular known situation where a mobile device remains "on" for a prolonged period in a power-hungry state in 3GPP, for example, if a data call, such as browsing a web page, lasts 11.8 seconds from launch to finish, there will be a subsequent DCH timeout period of 9 seconds. During this 9 second timeout period, a mobile device may still draw a high current load (e.g., 300 mA). Further, after the DCH timeout, a still subsequent Forward Access Channel (FACH) timeout of another 11 seconds occurs at a somewhat reduced, yet still substantial, current load. Thus, in this example the entire process from start of a data call to an idle state lasts for almost 33 seconds, with 20 of those seconds due to signaling overhead with an attendant higher current loading in the mobile device. This is an issue that needs to be addressed through optimization to try to reduce signaling overhead and signaling latency, while also trying to minimize power consumption as much as possible.

In 3GPP standards (Release 7 and onwards), there exist known features to resolve the above issues of signaling latency, signaling overhead, and power consumption. As one example, a known "Enhanced Cell_FACH" state requires the mobile device to stay in a power efficient state while the RRC (Radio Resource Control that is at the network layer) remains connected. Another known feature is termed "fast dormancy," which allows a mobile device the flexibility to request RRC state transition from a "power-hungry" state to a power-efficient state upon detection of data session inactivity. Nonetheless, even with these features, there still exists a need to further optimize power consumption, signaling latency, and signaling overhead.

SUMMARY

According to an aspect, a method for optimizing power consumption in a wireless device by determining an optimal signal release timing is disclosed. The method includes measuring accumulated data volume of one or more data calls received and transmitted in the device during a first time period during which the device is in a connected state. The method further includes determining whether the accumulated data volume exceeds a predetermined threshold after the first time period. Dependent on whether the accumulated data volume exceeds the threshold or not, a second time period is set to a first value if the accumulated data volume does not exceed the predetermined threshold, and to a second value if the accumulated data volume equals or exceeds the predetermined threshold. The second time period measures a time of the connected state. Finally, the method includes determining when the second time period expires, and sending a signaling message to signal release of the connected state when at least the second time period has expired.

According to another aspect, a wireless communication device is disclosed that includes means for measuring accumulated data volume of one or more data calls received and transmitted in the device during a first time period during which the device is in a connected state. The apparatus also includes means for determining whether the accumulated data volume exceeds a predetermined threshold after the first time period, and means for setting a second time period to a first value if the accumulated data volume does not exceed the predetermined threshold, and to a second value if the accumulated data volume equals or exceeds the predetermined threshold, wherein the second time period measures a time of the connected state. Further included are means for determining when the second time period expires, and means for sending a signaling message to signal release of the connected state when at least the second time period has expired.

According to still another aspect, an apparatus is disclosed including at least one processor. The processor is configured to measure accumulated data volume of one or more data calls received and transmitted in a wireless device during a first time period during which the device is in a connected state. Additionally, the processor is configured to determine whether the accumulated data volume exceeds a predetermined threshold after the first time period. Still further, the process is configured to set a second time period to a first value if the accumulated data volume does not exceed the predetermined threshold, and to a second value if the accumulated data volume equals or exceeds the predetermined threshold, wherein the second time period measures a time of the connected state. The processor is also configured to determine when the second time period expires, and send a signaling message to signal release of the connected state when at least the second time period has expired. The apparatus also includes a memory in communication with the at least one processor.

According to yet one more aspect, a computer program product comprising a computer-readable medium is disclosed. The medium comprises code for causing a computer to measure accumulated data volume of one or more data calls received and transmitted in a wireless device during a first time period during which the device is in a connected state. The medium also comprises code for causing a computer to determine whether the accumulated data volume exceeds a predetermined threshold after the first time period. Also, the medium comprises code for causing a computer to set a second time period to a first value if the accumulated data volume does not exceed the predetermined threshold, and to a second value if the accumulated data volume equals or exceeds the predetermined threshold, wherein the second time period measures a time of the connected state. Further, the medium comprises code for causing a computer to determine when the second time period expires, and code for causing a computer to send a signaling message to signal release of the connected state when at least the second time period has expired.

BRIEF DESCRIPTION OF THE DRAWINGS

FIG. 7 is another exemplary wireless apparatus for use with the presently disclosed apparatus and methods.

DETAILED DESCRIPTION

The present disclosure concerns methods and apparatus for optimizing power-consumption and signaling overhead for mobile devices based on statistical application traffic patterns, as well as traffic types. That is, based on observed statistical characteristics of mobile device application traffic patterns and traffic types, an algorithm or methodology according to the present disclosure is constructed to better lower power-consumption and signaling overhead based on such knowledge.

It is first noted that the present methods and apparatus are preferably implemented within a mobile device or user equipment (or, UE for short, which is simply another term for a mobile device), but should not necessarily be limited to such. Furthermore, although the disclosure is primarily relating to a methodology or algorithm executed by a processor (e.g., software), the implementation could be in hardware (e.g., logic devices) as well. In one aspect, the disclosed methodology can be performed by a smartphone high-level operating system (HLOS) (e.g. Win 7, iPhone, Android, etc.) or their applications. In addition, the disclosed methodology may be performed by a 3G modem as well.

It is also noted that the word "exemplary" is used herein to mean "serving as an example, instance, or illustration." Any embodiment described herein as "exemplary" is not necessarily to be construed as preferred or advantageous over other embodiments.

Figure 1:
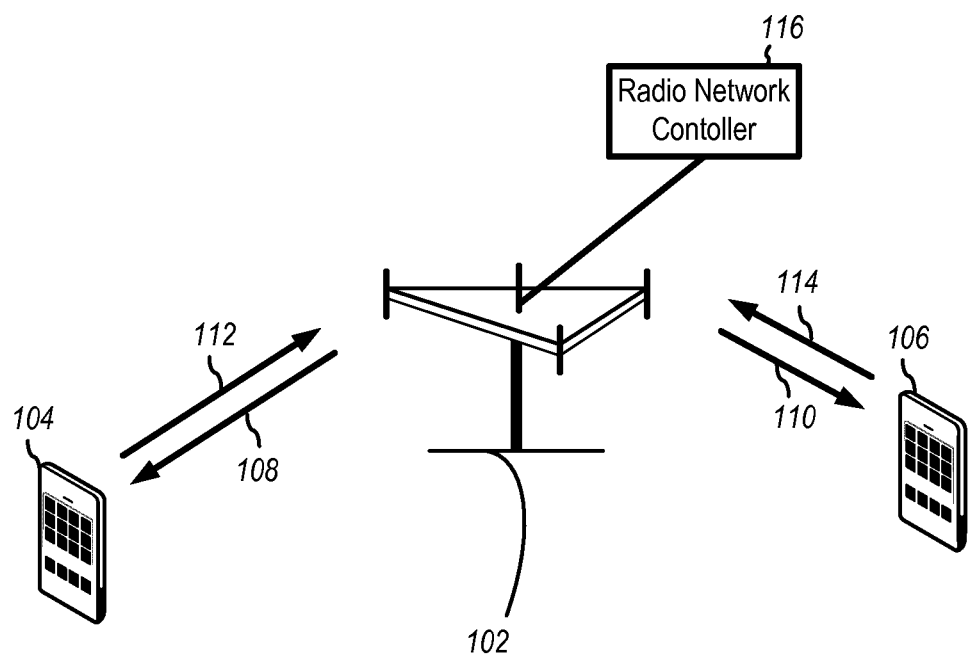
FIG. 1 illustrates an exemplary network in which the present apparatus and methods may be utilized.

FIG. 1 illustrates an exemplary environment 100 in which the present method and apparatus may be employed. As illustrated, the environment may be a multiple access wireless communication system 100. An access point (AP), NodeB or eNodeB 102 may include multiple antenna groups that afford communication to various network device, such as User Equipment (UE) or access terminals 104 or 106. Each UE 104, 106 is in communication with the NodeB or eNodeB 102 and receives transmitted information over forward links or downlinks 108 or 110, respectively. Similarly, each UE transmits information to the NodeB or eNodeB 102 over reverse links or uplinks 112, 114. In a FDD system, communication links 108, 110, 112, and 114 may use different frequency for communication. For example, forward link 108 may use a different frequency than that used by reverse link 112.

An access point may be a fixed station used for communicating with the terminals and may also be referred to as an access point, a Node B, an eNodeB or some other terminology. Additionally, the access point 102 may be in communication with or connected to a radio network controller (RNC) 116 for, in part, controlling access of mobile devices with the access point 102. An access terminal may also be called a mobile terminal, a mobile device, a user equipment (UE), a wireless communication device, terminal, access terminal or some other terminology.

Different statistical characteristics that have been recognized and considered for developing the present optimization methodology. These include: (1) duration of a packet switched (PS) data call; (2) data volume of a PS data call; (3) Inter-arrival of PS data calls; and (4) High Speed Downlink Packet Access (HSDPA) downlink scheduling. The first statistical characteristic considered, i.e., duration of a PS data call, recognizes that most PS data calls are brief having peak duration of around 8 seconds, and these short data calls are likely to constitute a "keep alive" type of data call where the UE is kept in an active connected state. The second first statistical characteristic considered, i.e., data volume of a PS data call, recognizes that the majority of data calls are of very small volume (e.g., less than 1 Kbytes of data). Examples of these types of calls are push email, social networking, and instant messaging. Additionally, the third statistical consideration, i.e., inter-arrival of PS data calls, recognizes that the majority of consecutive data calls occur within 60 seconds. In other words, the majority of data calls are closely spaced in time and "chatty". Finally, the fourth statistical consideration, i.e., High Speed Downlink Packet Access (HSDPA) downlink scheduling, recognizes that for typical HSDPA scheduling for push emails, the data call typically lasts for about 8 seconds, and within that time, most data transmission takes place in the first few seconds.

Figure 2:
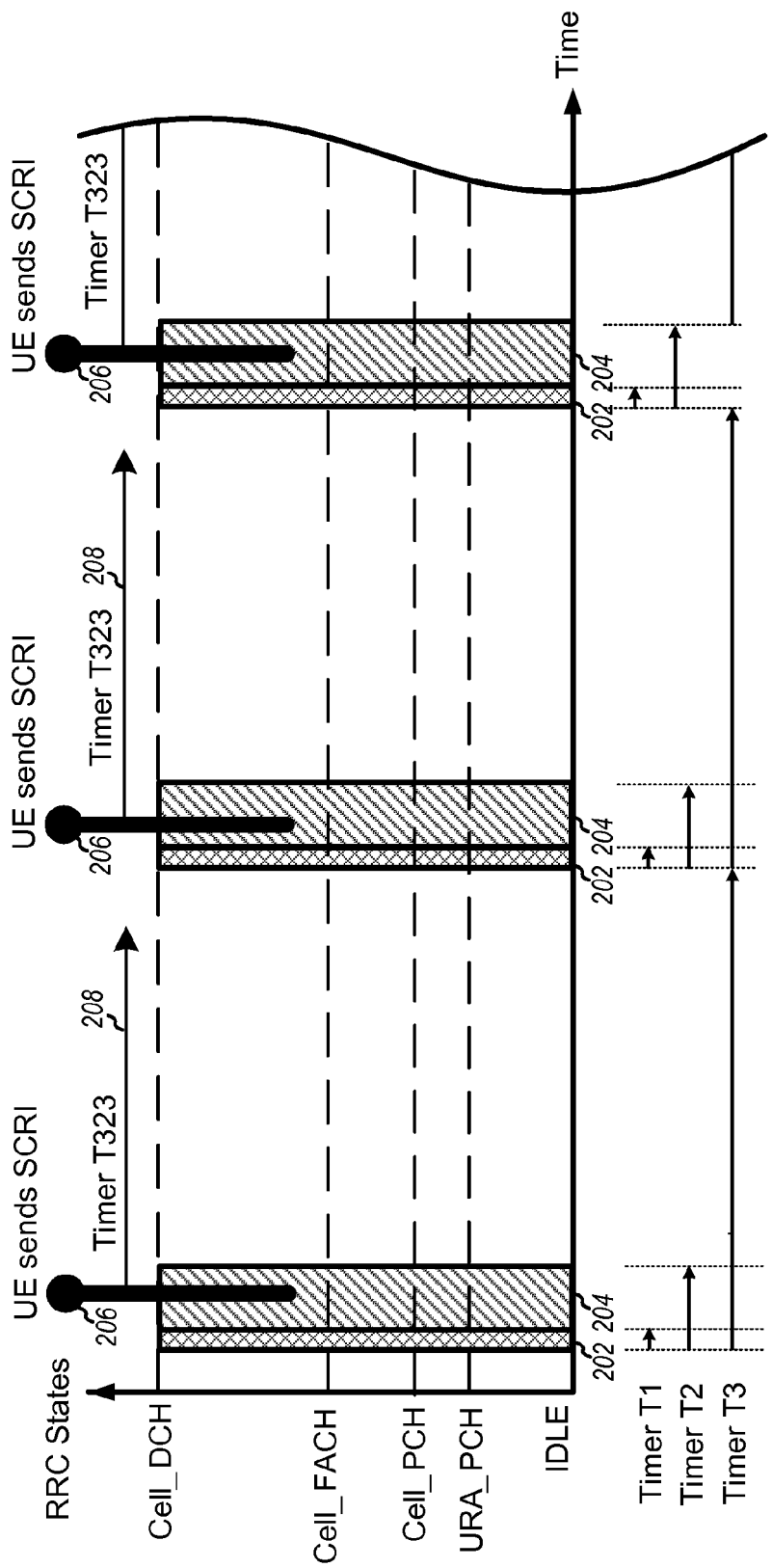
FIG. 2 is an illustration of a first type of traffic for a radio technology.

Additionally, the present apparatus and methods account for different types of traffic use cases. In general, there are two types of traffic use cases. The first traffic type (termed herein as "Traffic Type 1") is when a user is not performing any data calls, but still some background traffic may be nonetheless occurring in a UE. An illustration of this type of traffic is shown in FIG. 2 illustrating the data and signaling (i.e., RRC states) occurring over time in this traffic type. The example of FIG. 2 illustrates a case of 3GPP "fast dormancy" known in UMTS, but is not intended to limit application of the present apparatus and methods to other known technologies. As may be seen in FIG. 2, Traffic Type 1 may include a "keep alive" message 202, and other background traffic 204 including a Signaling Connection Release Indication (SCRI) message 206 sent by the UE to a Radio Network Controller (RNC). These two shaded areas 202, 204 indicate that the UE is in a CELL_DCH state wherein the power consumption is high. When the UE sends the SCRI message 206 to the RNC, the UE is requesting a release of signaling connections and moves to an idle state for at least the duration of a known time counted by a timer during which another SCRI message is prohibited or prevented from being transmitted (known in UMTS as "Timer T323" or the fast dormancy timer and indicated by time duration 208 in FIG. 1). Then the network puts the connection in idle state in which the physical connection is removed while the IP address is maintained or kept at higher layers (e.g., the RRC and above).

Additionally, a timer T1 is used to measure the time of active data transfer when the UE is in a connected state. Illustrated timer T2 is a timer to keep track of the time that the UE is in a connected state wherein the UE may be performing active data transfer or can be inactive in terms of data transfer. Stated another way, this timer keeps track of the time duration from RRC set up to the RRC release. It is noted that to optimize the power consumption, this timer T2 may be configured to be shorter than a network Cell_DCH inactivity timer. In one example, the default values for this time could be 8 seconds for short PS call and 18 seconds for long PS calls.

Timer T3 is a timer to keep track of or determine the duration between two consecutive RRC establishments (i.e., the inter-arrival time of data calls). T3 expiration has a value set to some predetermined value (e.g., T3_EXP seconds), and this is configurable. A statistically based default value may be 60 seconds for sake of example. Additionally, as mentioned above, Timer T323 is a fast dormancy timer (referring to 3GPP Rel-8 TS25.331 standard specification), and is configured by the network via RRC high layer signaling.

It is noted that according to an aspect of the present apparatus and methods, the values of the timers T2 and T3 are configurable (or selectively variable) based on statistical data, such as the one or more of the statistical data discussed above. T2 may be configurable to at least two different values based on the PS data volume. For example, if the volume is lower than a threshold, it can be deduced that the PS data call is a short call, whereas if the volume is equal or greater than the threshold, it can be deduced that the data call is a longer PS data call. In a specific implementation, the time T2 for short PS data calls could be set at 8 seconds based on statistical data, and at 18 seconds for long PS data calls.

Figure 3:
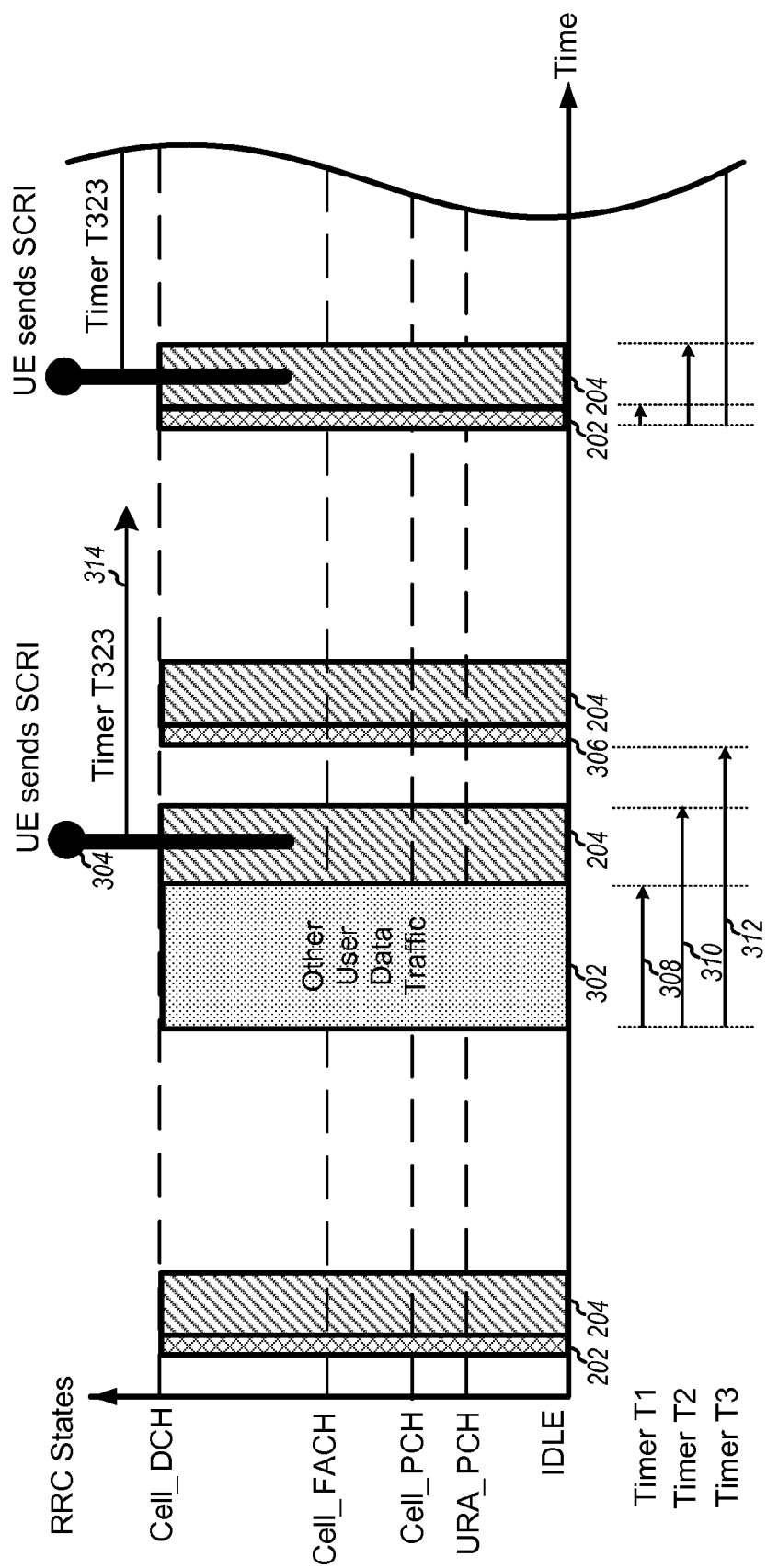
FIG. 3 is an illustration of a second type of traffic for a radio technology.

A second type of traffic (termed herein "Traffic Type 2") is when other type of user data traffic calls occur between two brief data calls. This type of traffic is a mixture of the "keep alive" message and other user data traffic. As an illustration, FIG. 3 shows other user data traffic 302 occurring between the short data calls (e.g., the keep alive messages 202). After the other user data traffic is completed, the UE sends the SCRI message 304.

For the illustration of Traffic Type 2 in FIG. 3, the measurement of timers T1, T2, and T3, are shown for this illustrated instance of Type 2 traffic. Timer T1 is shown at 308 for measuring the time of active connection for the user data traffic 302. Timer T2, as shown at 310, measures the time from RRC set up for data traffic 302 to the RRC release. Timer T3 is shown at 312 measuring the duration between two consecutive RRC establishments (e.g., the inter-arrival time of data traffic 302 and keep alive message 304). Finally, Timer T323 started by the sending of SCRI message 304 is illustrated at reference number 314.

Taking into consideration the above characteristics and traffic types, the present methods and apparatus provide optimization, in part, through a determination of an optimal timing when the UE will trigger sending the SCRI (Signaling Connection Release Indication) message to the network to initiate the Fast Dormancy procedure, for example. In an aspect, the optimization may leverage the benefits of 3GPP HSPA+ advanced features such as enhanced Cell_FACH feature and Fast Dormancy feature.

In an aspect, the present methods and apparatus effect measurement of the accumulated data call volume while a data call is active. After a time period of the active data call (e.g., time T1) has expired, the level of the data volume is checked to determine the nature of the data traffic (i.e., Traffic Type 1 vs. Traffic Type 2). If the volume is small, which would indicated Traffic Type 1, then a second time period to be counted (e.g., time T2) is set lower since the data call is small. On the other hand, if the volume is larger, which would be indicative of Traffic Type 2, then the second time period to be counted (i.e., time T2) may be set higher since to accommodate that larger data call and ensure an SCRI message is not sent prematurely. In this manner, an optimal timing to trigger the SCRI is set based on the nature of the type of data traffic, thereby providing lower power-consumption and signaling overhead to optimize the known Fast Dormancy feature. Furthermore, the statistical traffic use data, which may be empirically derived, is significant for setting the best or optimal values of the timers T1 and T2.

Figure 4:
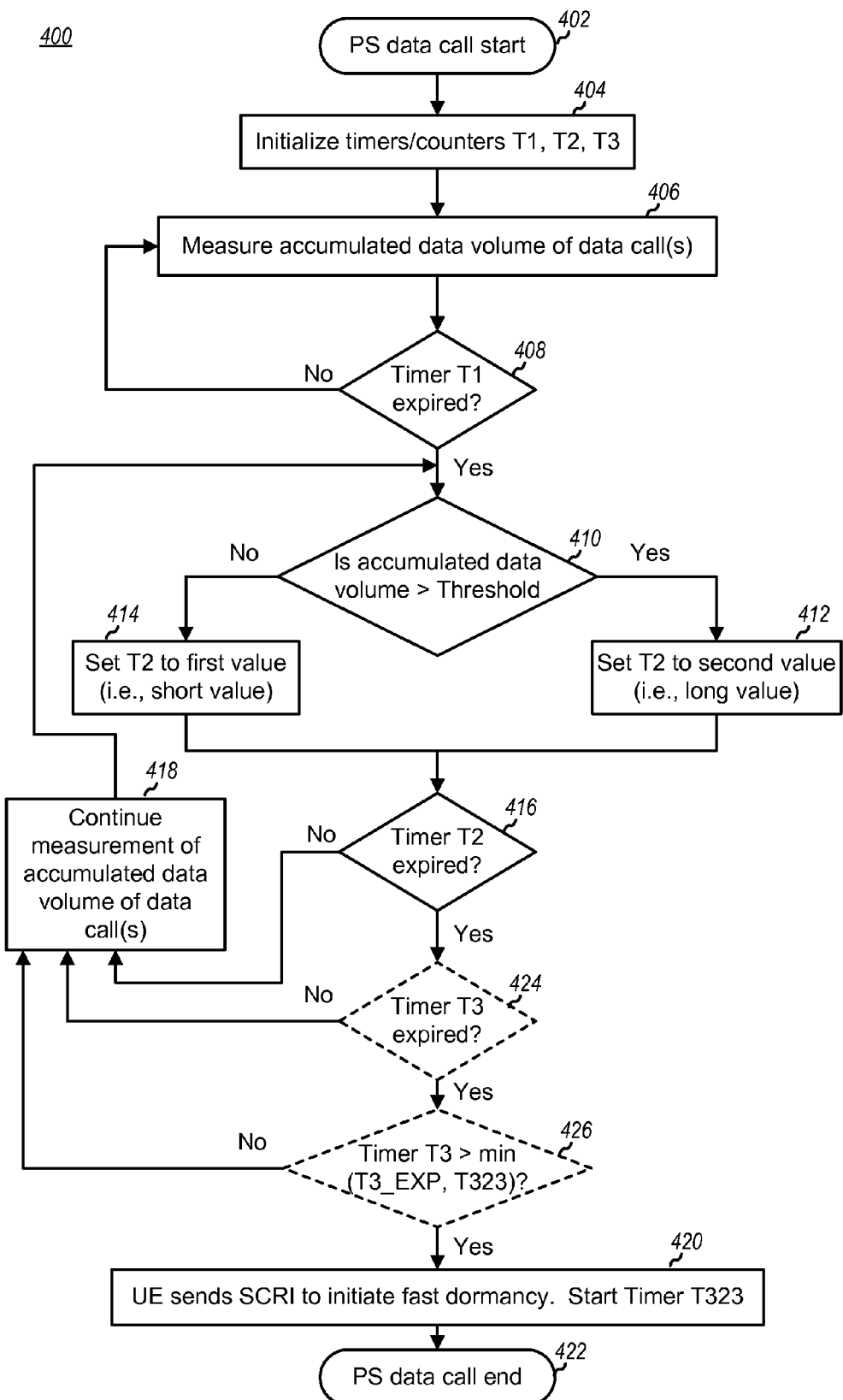
FIG. 4 is a flow diagram of an exemplary method for optimization according to the present disclosure.

FIG. 4 provides an exemplary flow diagram illustrating the present inventive optimization methodology 400 in more detail. First, a UE initiates upon occurrence of a new data call set up as shown in block 402. In block 404, the three timers T1, T2, and T3 as discussed above are initialized. In an aspect, timers T1, T2, and T3 are only initialized. In a particular example, Timer T1 may be set to a first value (i.e., an expiration value of T1_EXP seconds). As mentioned before, the first value (T1_EXP) is configurable. In one example, however, the default value could be set to 3 seconds based on empirical observations. Timer T2 expiration value may be set to at least one of two different values based on whether the PS call is short or long. In an example, the expiration value of T2 (e.g., T2_EXP) may be either a short value (e.g., T2_EXP_SHORT) or a value greater than the short value (e.g., T2_EXP_LONG). The short and long values for T2_EXP are configurable. In an aspect, a default value is 8 seconds for short PS calls (i.e., T2_EXP_SHORT) or 18 seconds for longer PS calls (i.e., T2_EXP_LONG). It is again noted that in order to better optimize the power consumption for a UE, this timer may be set to shorter than the network Cell_DCH inactivity timer.

Furthermore, Timer T3 may be set to have a particular expiration value (e.g., T3_EXP) seconds, and is configurable. In an aspect, a default value for T3_EXP may be 60 seconds. It is noted that Timer T323, being the fast dormancy timer (referring to 3GPP Rel-8 TS25.331 standard specification) or a timer during which transmission of the signaling message (e.g., SCRI) is prevented, is configured by the network, such as RRC high layer signaling from an RNC (e.g., RNC 116). Thus, the time for T323 is network determined.

After initialization of the timers in block 404, flow proceeds to block 406 where the accumulated PS call data volume is measured. This volume is the total volume of downlink and uplink traffic that the UE (e.g., such as 104 over link 108 and 112) has received and transmitted since the beginning of RRC connection establishment. In an aspect, the PS call data volume may be measured with a volume counter (designated by an exemplary acronym "PSVOL") that counts in Bytes, for example, and may have its initial value set at zero. In another aspect, the volume counter is used to count the traffic volume during the first time period (i.e., the expiration time of Timer T1) as is indicated by decision block 408 and loop back to block 406 if the timer T1 has not expired.

After expiration of the first time period (i.e., Timer T1), flow proceeds to decision block 410 where the measured accumulated volume (PSVOL) is compared with a default threshold volume (e.g., term PSVOL_THR for PS data call volume threshold). In one aspect, a default value for this threshold value may be 1 Kilobyte based on empirical statistical findings. The comparison of the accumulated volume to the predetermined threshold serves to determine the type of data traffic; e.g., to determine if the PS data call is a Traffic Type 1 or Traffic Type 2 situation, in one example.

If the volume (PSVOL) is greater than (or equal to) the volume threshold (PSVOL_THR), this is indicative of a Traffic Type 2 situation. Accordingly flow would proceed from block 410 to block 412 where a second time period (i.e., the expiration value for Timer T2 in seconds) is set to have an expiration time equal to a long value (also termed the "second value"). This long value, as discussed before, may be set to a value of 18 seconds based on empirical data, but is not limited to such and could be set lesser or greater dependent on the particular system statistics. If, at block 410, the accumulated data volume is less than the threshold (PSVOL_THR), this is indicative of a Traffic Type 1 situation. In this case, flow proceeds to block 414 where the Timer T2 expiration time may be set to a short value (also termed the "first value") that is less than the long value. As also discussed above, an exemplary default value for the short value or "first value" may be 8 seconds based on empirical data, but is not limited to such and may be either lesser or greater. As will be appreciated by those skilled in the art, the short or first value accommodates short data calls such as a "keep alive" message (e.g., 202), Push email, and so forth, while the long or second value accommodates other types of packet data calls such as web browsing, video streaming, FTP, and so forth, which was represented by data call 302 in FIG. 3 as one example.

Flow proceeds from both blocks 412 and 414 to decision block 416 to determine if the Timer T2 or second time period has expired. If not, flow proceeds to block 418 wherein the packet data session continues and also continued measurement of the accumulated PS call data volume (PSVOL) is effected, and flow proceeds back to block 410 to again determine what type of traffic is being transmitted and/or received. On the other hand, if Timer T2 is expired as determined at block 416, the flow may proceed directly to block 420 according to one aspect. The UE then sends a signaling message to the RRC layer to signal release of a data call (e.g., the SCRI message may then be sent to initiate a fast dormancy procedure). Additionally, the Timer T323 is also started with the signaling message to ensure that the UE does not send another new signaling message (e.g., another SCRI message). After block 420, the connected state (e.g., the RRC connected state) or the PS data call may be terminated as indicated by block 422. It is noted that by allowing the Timers T1 and T2 to be configurable, and further by determining the PS data traffic type and setting Timer T2 to either a short or long value based on the determined traffic type, the present method 400 affords additional optimization over merely a fast dormancy operation. That is, the present method 400 allows a call to be terminated more quickly for Traffic Type 1 calls, thus optimizing power consumption, while ensuring that the call is not too quickly terminated in Traffic Type 2 calls, thus optimizing signaling overhead and reducing the signaling latency by avoiding the increased signaling and time delays arising if the call were too quickly terminated and subsequently re-established in the second situation.

As a further alternative, method 400 may also include further determination or checks between after determining the expiration of Timer T2 in block 416 and prior to sending the signaling message in block 420. In particular, this alternative may include determining whether Timer T3 or a third time period has expired as indicated by dashed decision block 424. In this alternative, if Timer T3 has not expired, flow proceeds back to block 418. Additionally, a check concerning T323 may be made in alternative decision block 426 to prohibit the UE from unnecessarily sending another new SCRI message. If the timer T3 expires at the time later than minimal value of the T3_EXP value and the Timer T323 value, this is indicative that the data call is a brief "Keep Alive" type of data call. If the T3 expires at the time sooner than minimal of (T3_EXP, T323), this data call is the other type of user traffic (mixed, but not simply "Keep Alive" traffic) and flow may proceed from block 426 back to block 418. For the latter case, the UE may be configured to not send the signaling message (e.g., the SCRI message) for the next data call because the T323 is still running as shown by specific instance 314 of Timer T323 in FIG. 3. Additionally, even though a data call is ended at block 422, in an aspect Timer T3 also keeps running (until the next new data call setup) to keep track when the next data calls will arrive, i.e. measuring the inter-arrival time between two consecutive data calls.

Figure 5:
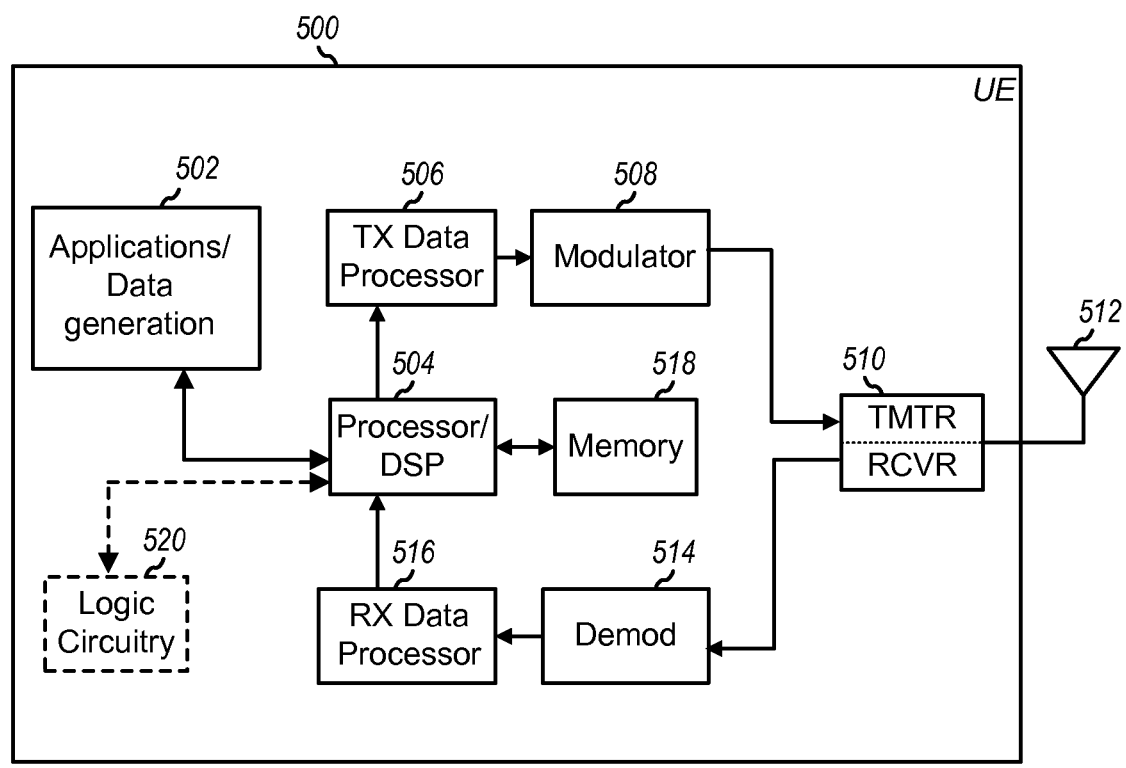
FIG. 5 illustrates an exemplary wireless apparatus for use with the presently disclosed apparatus and methods.

FIG. 5 illustrates an exemplary wireless apparatus 500, such as a UE, for effecting the presently disclosed apparatus and methodology. Apparatus 500 includes applications and sources of data (e.g., block or processor 502), which generate data for transmission such as voice call information or PS data call information. Block 502 may be implemented by any number of devices, such as an application processor implementing various data applications on the UE as one example.

Data from block 502 may be input to a processor 504, such as a digital signal processor (DSP) or similar device configured to process data for wireless transmission. Data from processor 504 is input to transmit (TX) data processor 506 that performs various functions such as encoding and arrangement of the data stream, such as for OFDM or W-CDMA transmissions. After processing of the transmission data by processor 506, the data is then passed to a modulator to modulate that data according to any of various modulation schemes, such as QPSK or QAM modulation. The modulated data is then delivered to at least one transmitter/receiver 510 (i.e., RF circuitry) for RF transmission via at least one antenna 512.

The transmitter/receiver 510 is also configured to receive signals via the at least one antenna 512. The signals are input to a demodulator 514 for demodulation according to whatever modulation scheme is utilized by a transmitter of the input signal. Demodulated data is then delivered to a receiver (RX) data processor 516 for decoding, and other various functions. The data is then delivered to processor 504 for use in the UE 500, such as for applications, PS data calls, or voice calls.

According to an aspect of the present disclosure, the method illustrated in FIG. 4 may be implemented by the processor 504, as well as the processor 504 in conjunction with the TX data processor 506, modulator 508, and transmitter/receiver 510. Furthermore, processor 504 may be coupled with a memory 518 that stores instructions or code for causing the processor 504 to implement the disclosed methodology. According to still another aspect, apparatus 500 may include optional logic circuitry 520 or similar hardware, such as a programmable logic device (PLD) or a field programmable gate array (FPGA), which implements one or more the processes of method 400 in FIG. 4. Yet in another aspect, the processor(s) (e.g., 502) for implementing applications or high level operating systems (HLOS) can be also utilized to perform one or more of the processes of method 400.

Figure 6:
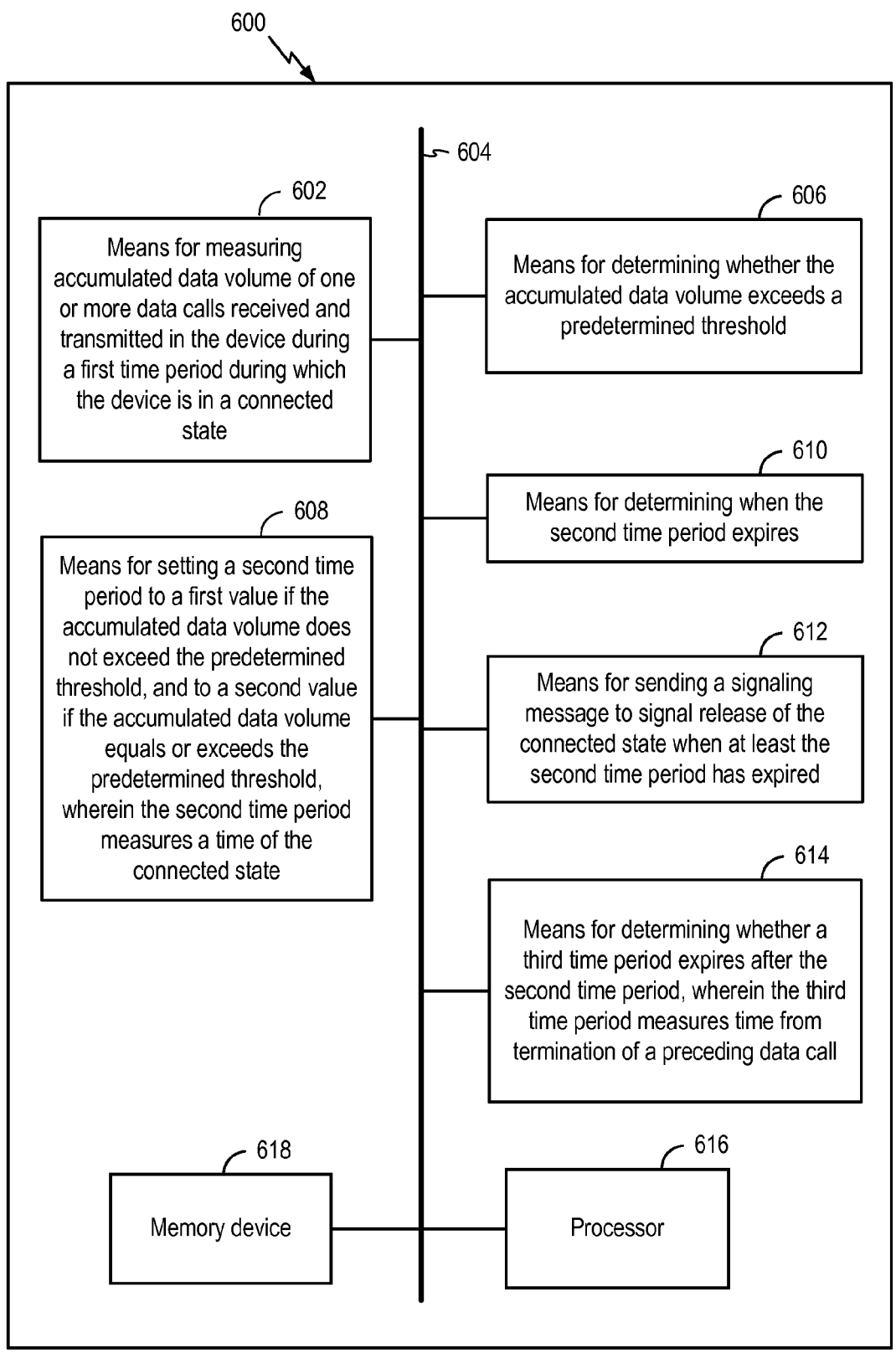
FIG. 6 is another exemplary wireless apparatus for use with the presently disclosed apparatus and methods.

FIG. 6 illustrates another exemplary apparatus 600 operable for employing the presently disclosed methods for optimizing power consumption and signaling overhead. Apparatus 600 is operable within a UE or other wireless device, or within portions thereof. As illustrated, the apparatus 600 may include a means or module 602 for measuring accumulated data volume of one or more data calls received and transmitted in the device during a first time period (e.g., the period of Timer T1) during which the device is in a connected state. In an aspect, means 602 may be implemented by processor 504 or processor 502 or logic 520, or any combination thereof, to measure both transmitted data calls via TX processor 506, as well as received data calls via RX data processor 516, as merely one example, or any other equivalent devices or structures for carrying out the measuring function. Additionally, it is noted that means 602 is configured to implement the process in block 406, as well as the initialization in block 404. Apparatus 600 includes a communication bus 604 as illustrated in the example of FIG. 6 merely to indicate that means, blocks, modules, or circuitry within apparatus 600 are communicatively coupled and that communication of data and information occurs there between.

Apparatus 600 further includes a means or module 606 for determining whether the accumulated data volume exceeds a predetermined threshold after expiration of the first time period (e.g., Timer T1). In an aspect, means 606 may be implemented by processors 504 or 502, logic 520, any combination thereof, or any equivalent thereof capable of performing the function. Additionally, it is noted that in an aspect means 606 is configured to implement the processes in blocks 408 and 410 of FIG. 4, for example.

Apparatus 600 further includes a means or module 608 for setting a second time period (e.g., Timer T2) to a first value (e.g., short value) if the accumulated data volume does not exceed the predetermined threshold, and to a second value (e.g., long value) if the accumulated data volume equals or exceeds the predetermined threshold, wherein the second time period measures a time of the connected state of the UE. Means 608 may be implemented by processors 504 or 502, logic 520, any combination thereof, or any equivalent thereof capable of performing the function. Additionally, in an aspect, means 608 may be configured to implement the processes of blocks 412 and 414 in method 400.

Apparatus 600 further includes a means 610 for determining when the second time period expires. Means 610 may be implemented by processors 504 or 502, logic 520, any combination thereof, or any equivalent thereof capable of performing the functionality. Furthermore, in an aspect means 610 may be configured to implement the process shown in block 416 in method 400. Apparatus 600 also includes a means 612 for sending a signaling message to signal release of the connected state (e.g., an SCRI message) when at least the second time period has expired as determined by means 610. Means 612 may be implemented by one or more of processors 504 or 502, logic 520, any combination thereof, or any equivalent thereof capable of performing the functionality. Means 612 may also include the TX data processor 506, modulator 508, and transmitter/receiver 510, as one example, for sending of the signaling message. Means 612 may also, in another aspect, be considered to encompass those structures or processors that implement RRC layer operations.

In yet another aspect, apparatus 600 may optionally include a means 614 for determining whether a third time period (e.g., Timer T3) expires after the second time period, wherein the third time period measures time from termination of a preceding data call. This means may be implemented by one or more of processors 504 or 502, logic 520, any combination thereof, or any equivalent thereof capable of performing the functionality. Additionally, means 614 may be configured to implement one or more of blocks 424, 426 (which involves further determination of a minimum of T323 and T3_EXP). In still a further aspect, means 614 may also include means for sending the signaling message after expiration of the third time period, and may be further implemented by TX data processor 506, modulator 508, and transmitter/receiver 510, as one example.

In another optional aspect, apparatus 600 may include also includes a general processor 616 (or application specific processor in another aspect), which may perform any or all of the various functions of the various means of apparatus 600 in association with a memory device 618 used to store instructions executable by the processor 616 to implement one or more various functions. Additionally, count and timer values, used in any of the means or in method 400 may be managed by such a processor and memory.

It is noted that any of the means in apparatus 600 may be implemented with hardware, software, firmware, or any combination thereof, and may further be implemented separately as shown, or alternatively in an integral unit such as in a processor 616 or similar device.

FIG. 7 shows part of a hardware implementation of another circuit apparatus 700 that is configured to employ the presently disclosed methods for detecting parameter mismatch in a receiver. The circuit apparatus includes circuitry and may be one configuration of a transceiver in a UE. In this application, it should be clear that the terms "circuit" and "circuitry" are to be construed as structural terms and not as functional terms. For example, circuitry can be an aggregate of circuit components, such as a multiplicity of integrated circuit components, in the form of processing and/or memory cells, units, blocks, and the like, such as shown and described in FIG. 7.

The apparatus 700 comprises a central data bus 702 linking several circuits together. The circuits include a processor 704, a receive circuit 706, a transmit circuit 708, and a memory 710. The memory 710 is in electronic communication with the processor 704, i.e., the processor 704 can read information from and/or write information to the memory 710.

The processor 704 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. The processor 704 may include a combination of processing devices, e.g., a combination of a DSP and a microprocessor, a plurality of microprocessors, one or more microprocessors in conjunction with a DSP core, or any other such configuration.

The receive circuit 706 and the transmit circuit 708 can be connected to or part of an RF (Radio Frequency) circuit, which is not explicitly delineated in FIG. 7. The receive circuit 706 may process received signals before sending the signals out to the data bus 702. Additionally, the transmit circuit 708 may process data from the data bus 702 before sending the data out of the device 700. The processor 704 may perform the function of data management of the data bus 702 and further the function of general data processing, including executing the instructional contents of the memory 710. Instead of separately disposed as shown in FIG. 7, as an alternative, the transmit circuit 708 and the receive circuit 706 may be integral with each other, and also may be part of the processor 704.

The memory 710 includes a set of instructions generally signified by the reference numeral 712. The instructions 712 may be executable by the processor 704 to implement the methods described herein, such as the method of FIG. 4, for example. The instructions 712 may include code 714 to measure accumulated data volume of one or more data calls received and transmitted in the device during a first time period during which the device is in a connected state. Additionally, the instructions 712 may also include code 716 to determine whether the accumulated data volume exceeds a predetermined threshold after the first time period.

Furthermore, instructions 712 includes code 718 to set a second time period to a first value if the accumulated data volume does not exceed the predetermined threshold, and to a second value if the accumulated data volume equals or exceeds the predetermined threshold, wherein the second time period measures a time of the connected state. Instructions 712 also include code 720 to determine when the second time period expires. Still further, instructions 712 also include code 722 to send a signaling message to signal release of the connected state (e.g., an SCRI message) when at least the second time period has expired.

Finally, instruction 712 may also include code 724 to code for causing a computer to determine whether a third time period (e.g., Timer T3) expires after the second time period (e.g., Timer T2), wherein the third time period measures time from termination of a preceding data call. Although not shown in FIG. 7, code 724 may also include code for causing a computer to send the signaling message after expiration of the third time period.

The instructions 712 shown in the memory 710 may comprise any type of computer-readable statement(s) or code that may cause a computer or processor to perform particular functions or operations. For example, the instructions 712 in the memory 710 may refer to one or more programs, routines, sub-routines, modules, functions, procedures, data sets, etc. The instructions 712 may comprise a single computer-readable statement or multiple computer-readable statements.

The memory 710 may be a RAM (Random Access Memory) circuit. The memory 710 can be tied to another memory circuit (not shown) which either can be of the volatile or nonvolatile type. As an alternative, the memory 710 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. The memory 710 may be considered to be an example of a computer-program product that comprises a computer-readable medium with instructions 712 stored therein.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not necessarily meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC or other type of integrated circuit. The ASIC may reside in a user terminal. In the alternative, the processor and the storage medium may reside as discrete components in a user terminal.

The above description of the disclosed examples is provided to enable any person skilled in the art to make or use the present apparatus and methods. Various modifications to these methods and apparatus will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for optimizing power consumption in a wireless device by determining an optimal signal release timing, the method comprising:
   measuring accumulated data volume of one or more data calls received and transmitted in the device during a first time period during which the device is in a connected state;
   determining whether the accumulated data volume exceeds a predetermined threshold after the first time period;
   setting a second time period to a first value if the accumulated data volume does not exceed the predetermined threshold, and to a second value if the accumulated data volume equals or exceeds the predetermined threshold, wherein the second time period measures a time of the connected state;
determining when the second time period expires; and
sending a signaling message to signal release of the connected state when at least the second time period has expired.

2. The method of claim 1, further comprising:
determining whether a third time period expires after the second time period, wherein the third time period measures time from termination of a preceding data call; and
sending the signaling message after expiration of the third time period.

3. The method of claim 2, further comprising:
determining that the third time period has expired if the third time period value is greater than a minimal value of the set third time period or timer during which transmission of the signaling message is prevented (T323).

4. The method of claim 1, wherein the signaling message comprises a Signaling Connection Release Indication (SCRI) message to initiate a fast dormancy procedure.

5. The method of claim 1, wherein at least one of the one or more data calls comprises a Packet Switched (PS) data call.

6. The method of claim 1, wherein the connected state comprises connection of the device to a network at a Radio Resource Connection (RRC) layer and release of the connected state further comprises the device entering an idle state.

7. A wireless communication device comprising:
means for measuring accumulated data volume of one or more data calls received and transmitted in the device during a first time period during which the device is in a connected state;
means for determining whether the accumulated data volume exceeds a predetermined threshold after the first time period;
means for setting a second time period to a first value if the accumulated data volume does not exceed the predetermined threshold, and to a second value if the accumulated data volume equals or exceeds the predetermined threshold, wherein the second time period measures a time of the connected state;
means for determining when the second time period expires; and
means for sending a signaling message to signal release of the connected state when at least the second time period has expired.

8. The apparatus of claim 7, further comprising:
means for determining whether a third time period expires after the second time period, wherein the third time period measures time from termination of a preceding data call; and
means for sending the signaling message after expiration of the third time period.

9. The apparatus of claim 8, further comprising:
means for determining that the third time period has expired if the third time period value is greater than a minimal value of the set third time period or a timer during which transmission of the signaling message is prevented.

10. The apparatus of claim 7, wherein the signaling message comprises a Signaling Connection Release Indication (SCRI) message to initiate a fast dormancy procedure.

11. The apparatus of claim 7, wherein at least one of the one or more data calls comprises a Packet Switched (PS) data call.

12. The apparatus of claim 7, wherein the connected state comprises connection of the device to a network at a Radio Resource Connection (RRC) layer and release of the connected state further comprises the device entering an idle state.

13. An apparatus comprising:
at least one processor to:
measure accumulated data volume of one or more data calls received and transmitted in a wireless device during a first time period during which the device is in a connected state;
determine whether the accumulated data volume exceeds a predetermined threshold after the first time period;
set a second time period to a first value if the accumulated data volume does not exceed the predetermined threshold, and to a second value if the accumulated data volume equals or exceeds the predetermined threshold, wherein the second time period measures a time of the connected state;
determine when the second time period expires; and
send a signaling message to signal release of the connected state when at least the second time period has expired; and
a memory in communication with the at least one processor.

14. The apparatus of claim 13, wherein the at least one processor is further configured to:
determine whether a third time period expires after the second time period, wherein the third time period measures time from termination of a preceding data call; and
send the signaling message after expiration of the third time period.

15. The apparatus of claim 14, wherein the at least one processor is further configured to:
determine that the third time period has expired if the third time period value is greater than a minimal value of the set third time period or a timer during which transmission of the signaling message is prevented.

16. The apparatus of claim 13, wherein the signaling message comprises a Signaling Connection Release Indication (SCRI) message to initiate a fast dormancy procedure.

17. The apparatus of claim 13, wherein at least one of the one or more data calls comprises a Packet Switched (PS) data call.

18. The apparatus of claim 13, wherein the connected state comprises connection of the device to a network at a Radio Resource Connection (RRC) layer and release of the connected state further comprises the device entering an idle state.

19. A non-transitory computer program product comprising:
a computer-readable medium comprising:
code for causing a computer to measure accumulated data volume of one or more data calls received and transmitted in a wireless device during a first time period during which the device is in a connected state;
code for causing a computer to determine whether the accumulated data volume exceeds a predetermined threshold after the first time period;
code for causing a computer to set a second time period to a first value if the accumulated data volume does not exceed the predetermined threshold, and to a second value if the accumulated data volume equals or exceeds the predetermined threshold, wherein the second time period measures a time of the connected state;
code for causing a computer to determine when the second time period expires; and code for causing a computer to send a signaling message to signal release of the connected state when at least the second time period has expired.

20. The non-transitory computer program product of claim 19, wherein the computer-readable medium further comprises:
    code for causing a computer to determine whether a third time period expires after the second time period, wherein the third time period measures time from termination of a preceding data call; and
    code for causing a computer to send the signaling message after expiration of the third time period.

21. The non-transitory computer program product of claim 20, wherein the computer-readable medium further comprises:
    code for causing a computer to determine that the third time period has expired if the third time period value is greater than a minimal value of the set third time period or a timer during which transmission of the signaling message is prevented.

22. The non-transitory computer program product of claim 19, wherein the signaling message comprises a Signaling Connection Release Indication (SCRI) message to initiate a fast dormancy procedure.

23. The non-transitory computer program product of claim 19, wherein at least one of the one or more data calls comprises a Packet Switched (PS) data call.

24. The non-transitory computer program product of claim 19, wherein the connected state comprises connection of the device to a network at a Radio Resource Connection (RRC) layer and release of the connected state further comprises the device entering an idle state.

* * * * *